(12) United States Patent
Lindoff et al.

(10) Patent No.: US 8,396,141 B2
(45) Date of Patent: Mar. 12, 2013

(54) EFFICIENT CELL SELECTION

(75) Inventors: Bengt Lindoff, Bjärred (SE); Magnus Almgren, Sollentuna (SE); Henrik Asplund, Stockholm (SE); Anders Furuskär, Stockholm (SE); Niclas Wiberg, Linköping (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1944 days.

(21) Appl. No.: 11/289,184

(22) Filed: Nov. 29, 2005

(65) Prior Publication Data
US 2008/0031368 A1   Feb. 7, 2008

(51) Int. Cl.
H04K 1/10 (2006.01)
H04L 27/28 (2006.01)

(52) U.S. Cl. .......................... 375/260; 375/349; 375/340

(58) Field of Classification Search ............. 375/260, 375/134, 135, 141, 142, 144, 148; 370/332, 370/335; 455/450
See application file for complete search history.

(56) References Cited

U.S. PATENT DOCUMENTS

| | | | |
|---|---|---|---|
| 5,551,059 A * | 8/1996 | Hutcheson et al. | 455/429 |
| 6,157,820 A * | 12/2000 | Sourour et al. | 455/226.2 |
| 6,418,317 B1 * | 7/2002 | Cuffaro et al. | 455/450 |
| 6,574,235 B1 * | 6/2003 | Arslan et al. | 370/464 |
| 6,795,424 B1 * | 9/2004 | Kapoor et al. | 370/343 |
| 7,127,212 B2 * | 10/2006 | Fattouch | 455/63.1 |
| 7,164,649 B2 * | 1/2007 | Walton et al. | 370/203 |
| 7,245,679 B2 * | 7/2007 | Aoki et al. | 375/349 |
| 7,277,709 B2 * | 10/2007 | Vadgama | 455/453 |
| 7,280,604 B2 * | 10/2007 | Giannakis et al. | 375/260 |
| 7,286,481 B2 * | 10/2007 | Jacobsen | 370/248 |
| 7,286,506 B2 * | 10/2007 | Abrishamkar et al. | 370/332 |
| 7,315,527 B2 * | 1/2008 | Wei et al. | 370/328 |
| 7,352,799 B2 * | 4/2008 | Pajukoski | 375/148 |
| 7,356,071 B2 * | 4/2008 | Li et al. | 375/147 |
| 7,580,400 B2 * | 8/2009 | Sung et al. | 370/342 |

(Continued)

FOREIGN PATENT DOCUMENTS

| | | |
|---|---|---|
| EP | 1 480 350 A1 | 11/2004 |
| WO | 2004/064294 A2 | 7/2004 |

(Continued)

OTHER PUBLICATIONS

Ahmad Zuri Sha'ameri, "Comparison of Techniques for Estimating the Frequency Selectivity of Bandlimited Channels", Digital Signal Processing Lab, Universiti Teknologi Malaysia, 2000, IEEE pp. I-256 to I-260.*

(Continued)

*Primary Examiner* — Daniel Washburn
*Assistant Examiner* — Qutbuddin Ghulamali
(74) *Attorney, Agent, or Firm* — Potomac Patent Group PLLC

(57) ABSTRACT

Systems and methods of cell selection are based on measures of frequency selectivity, time selectivity, and/or antenna selectivity. For example, the delay spread and coherence bandwidth of a channel are two measures of frequency selectivity that can be taken into account in the cell selection process. In addition to or instead of either delay spread or coherence bandwidth, Doppler frequency shift or coherence time (which are two measures of time selectivity) and/or antenna correlation or mean signal strength per antenna (which are two measures of antenna selectivity), among other parameters, can be determined and taken into account.

24 Claims, 5 Drawing Sheets

U.S. PATENT DOCUMENTS

| | | | |
|---|---|---|---|
| 7,904,093 B2 * | 3/2011 | Nystrom et al. | 455/450 |
| 2002/0082013 A1 * | 6/2002 | Lee et al. | 455/436 |
| 2003/0012308 A1 * | 1/2003 | Sampath et al. | 375/340 |
| 2003/0083014 A1 * | 5/2003 | Li et al. | 455/63 |
| 2004/0105489 A1 | 6/2004 | Kim et al. | |
| 2005/0083888 A1 * | 4/2005 | Smee et al. | 370/332 |
| 2005/0096077 A1 * | 5/2005 | Moon | 455/522 |
| 2005/0105647 A1 | 5/2005 | Wilhelmsson et al. | |
| 2005/0163238 A1 * | 7/2005 | Fujii | 375/260 |
| 2005/0281221 A1 * | 12/2005 | Roh et al. | 370/328 |
| 2006/0133321 A1 * | 6/2006 | Lim et al. | 370/331 |
| 2006/0291371 A1 * | 12/2006 | Sutivong et al. | 370/208 |
| 2007/0121552 A1 | 5/2007 | Lindoff | |

FOREIGN PATENT DOCUMENTS

| | | | |
|---|---|---|---|
| WO | WO 2004064294 A2 * | 7/2004 | |
| WO | 2005/089009 A1 | 9/2005 | |

OTHER PUBLICATIONS

Klaus Witrisal et al, "A New Method to Measure Parameters of Frequency-Selective Radio Channels Using Power Measurements", IEEE, Transactions on Communications; vol. 49, No. 10, Oct. 2001, pp. 1788-1800.*

Proakis, J., "Digital Communications", Section 14.1.1, 4th Ed., McGraw-Hill, 2001.

3GPP TSG-RAN WG1 Ad Hoc on LTE, "Principles for the Evolved UTRA Radio-Access Concept", Sophia Antipolis, France, Jun. 20-21, 2005.

Ekstrom, H. et al., "Technical solutions for the 3G long-term evolution", IEEE Communications Magazine, vol. 44, Issue 3, pp. 38-45, Mar. 2006.

PCT International Search report, mailed May 7, 2007, in connection with International Application No. PCT/EP2006/067688.

PCT Written Opinion, mailed May 7, 2007, in connection with International Application No. PCT/EP2006/067688.

China State Intellectual Property Office, Translated First Office Action in 200680044339.5, Dec. 14, 2010.

China State Intellectual Property Office, Translated Comments by Examiner in 200680044339.5, Dec. 14, 2010.

* cited by examiner

EFFICIENT CELL SELECTION

BACKGROUND

This invention relates to communication systems and more particularly to digital communication systems.

Third generation (3 G) cellular wireless communication systems based on wideband code division multiple access (WCDMA) technology are being deployed all over the world. These systems are standardized by specifications promulgated by the Third Generation Partnership Project (3 GPP). Evolution of WCDMA radio access technology has occurred with the introduction of high-speed downlink packet access (HSDPA) and an enhanced uplink (UL).

FIG. 1 depicts a typical cellular wireless telecommunication system 10. Radio network controllers (RNCs) 12, 14 control various radio network functions, including for example radio access bearer setup, diversity handover, etc. In general, each RNC directs calls to and from a mobile station (MS), or remote terminal or user equipment (UE), via the appropriate base station(s) (BSs), which communicate with each other through downlink (DL) (i.e., base-to-mobile or forward) and UL (i.e., mobile-to-base or reverse) channels. In FIG. 1, RNC 12 is shown coupled to BSs 16, 18, 20, and RNC 14 is shown coupled to BSs 22, 24, 26.

Each BS, or Node B in 3 G vocabulary, serves a geographical area that is divided into one or more cell(s). In FIG. 1, BS 26 is shown as having five antenna sectors S1-S5, which can be said to make up the cell of the BS 26, although a sector or other area served by signals from a BS can also be called a cell. In addition, a BS may use more than one antenna to transmit signals to a UE. The BSs are typically coupled to their corresponding RNCs by dedicated telephone lines, optical fiber links, microwave links, etc. The RNCs 12, 14 are connected with external networks such as the public switched telephone network (PSTN), the internet, etc. through one or more core network nodes, such as a mobile switching center (not shown) and/or a packet radio service node (not shown).

In a communication system such as that depicted in FIG. 1, each BS usually transmits predetermined pilot symbols on the DL physical channel (DPCH) to a UE and on a common pilot channel (CPICH). A UE typically uses the CPICH pilot symbols in deciding which BS to listen to, which is a process called cell selection, and in estimating the impulse response of the radio channel to the BS. It will be recognized that the UE uses the CPICH pilots for channel estimation, rather than the DPCH pilots, due to the CPICH's typically higher signal-to-noise ratio (SNR). The UE uses the DPCH pilots for estimation of the signal-to-interference ratio (SIR), i.e., for DL transmission power control, among other things.

As UEs move with respect to the BSs, and possibly vice versa, on-going connections are maintained through a process of handover, or hand-off, in which as a user moves from one cell to another, the user's connection is handed over from one BS to another. Early cellular systems used hard handovers (HHOs), in which a first cell's BS (covering the cell that the user was leaving) would stop communicating with the user just as a second BS (covering the cell that the user was entering) started communication. Modern cellular systems typically use diversity, or soft, handovers (SHOs), in which a user is connected simultaneously to two or more BSs. In FIG. 1, MSs 28, 30 are shown communicating with plural BSs in diversity handover situations. MS 28 communicates with BSs 16, 18, 20, and MS 30 communicates with BSs 20, 22. A control communication link between the RNCs 12, 14 permits diversity communications to/from the MS 30 via the BSs 20, 22.

New radio transmission technologies are being considered for evolved-3 G and fourth generation (4 G) communication systems, although the structure of and functions carried out in such systems will generally be similar to those of the system depicted in FIG. 1. In particular, orthogonal frequency division multiplexing (OFDM) is under consideration for evolved-3 G and 4 G systems. An OFDM system can adapt its DL transmission parameters not only in the time domain, as in current communication systems, but also in the frequency domain. This can provide higher performance where the DL communication channel varies significantly across the system bandwidth. For example, combined time- and frequency-domain adaptation may yield a capacity gain of a factor two compared to time-domain-only adaptation for a so-called 3 GPP Typical-Urban channel and a system bandwidth of 20 megahertz (MHz).

As described above, cell selection and handover are fundamental functions in cellular communication systems in that these functions determine which cell(s) a remote terminal communicates with. The terms "cell selection" and "handover" are sometimes given distinguishable meanings. For example, "cell selection" can refer to a function in an idle terminal and "handover" can refer to a function in an active terminal. Nevertheless, the term "cell selection" is used in this application to cover both functions for simplicity of explanation.

Cell selection has a number of objectives, which include connecting terminals to the cell(s) that will provide the highest quality of service (QoS), consume the least power, and/or generate the least interference. It is also of interest to make robust cell selections, thereby limiting the number and frequency of cell re-selections.

Cell selection is traditionally based on the signal strength or SNR of candidate cells. For example, U.S. patent application Ser. No. 11/289,001 filed on Nov. 29, 2005, by B. Lindoff for "Cell Selection in High-Speed Downlink Packet Access Communication Systems", which is incorporated here by reference, describes a cell selection process that also takes into account the delay spread of the communication channel. For a given SNR, different delay spreads yield different qualities of service (e.g., different bit rates), and by taking this into account in the cell selection procedure, improved QoS can be achieved. In that patent application, the path delay profile in a typical WCDMA communication system is described as a useful representation of the delay spread.

It seems unlikely that estimation of the delay spread in an OFDM communication system would be done in the same way as in a WCDMA system. Moreover, the delay spread does not capture all of the variability of the communication channel, which also arises from the mobility of the UE and relay nodes or BSs with respect to one another, and from the correlation properties of signals transmitted from different antennas. Highly correlated antennas, which is to say antennas that produce signals that are highly correlated, yield little diversity gain, and so such antennas result in greater signal variations at receivers, leading to decreased cell selection accuracy. Correlation functions and their use in characterizing communication channels such as those in cellular communication systems are described in J. Proakis, "Digital Communications", Section 14.1.1, 4th ed., McGraw-Hill (2001).

SUMMARY

This application describes systems and methods of cell selection that do not suffer from these and other problems with prior systems and methods. In contrast with prior systems and methods, cell selection is based on measures of frequency selectivity, time selectivity, and/or antenna selectivity. For example, the delay spread and coherence bandwidth of a channel are two measures of frequency selectivity that can be taken into account in the cell selection process. In addition to or instead of either delay spread or coherence bandwidth, Doppler frequency shift or coherence time (which are two measures of time selectivity) and/or antenna correlation or mean signal strength per antenna (which are two measures of antenna selectivity), among other parameters, can be determined and taken into account.

In one aspect of this invention, there is provided an apparatus in a communication system that includes a plurality of cells, which transmit respective signals that include respective pilots through respective channels to a terminal. The apparatus includes a signal strength estimator configured to generate first estimates of at least one of signal strengths and signal-to-interference ratios of signals received from respective cells; an estimator configured to generate second estimates of at least one of a frequency selectivity, a time selectivity, and an antenna selectivity of respective channels between the terminal and respective cells; and a cell selector configured to generate a cell selection based on the first estimates and the second estimates.

In another aspect of this invention, there is provided a method of cell selection in a communication system that includes a plurality of cells, which transmit respective signals that include respective pilots through respective channels to a terminal. The method includes generating first estimates of at least one of signal strengths and signal-to-interference ratios of signals received from respective cells; generating second estimates of at least one of a frequency selectivity, a time selectivity, and an antenna selectivity of respective channels between the terminal and respective cells; and selecting a cell based on the first estimates and the second estimates.

BRIEF DESCRIPTION OF THE DRAWINGS

The several features, advantages, and objects of this invention will be understood by reading this description in conjunction with the drawings, in which.

DETAILED DESCRIPTION

The DL in evolved-3 G and 4 G communication systems may be based on OFDM, by which data is transmitted over a relatively large set of relatively narrow sub-carriers that are allocated at different frequencies. This application focuses on OFDM systems for economy of explanation, but it will be understood that the principles described in this application can be implemented in other digital communication systems.

Figure 2:
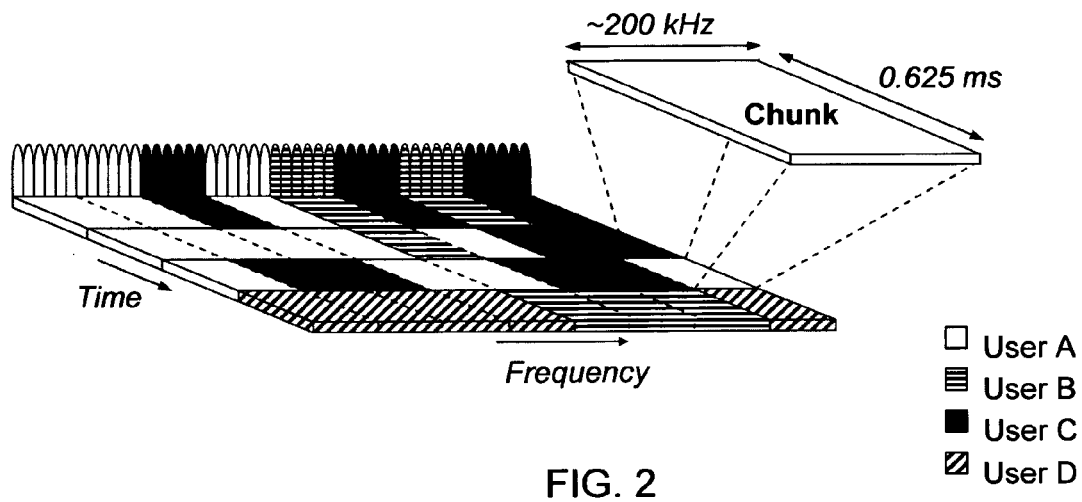
FIG. 2 depicts a time and frequency arrangement of sub-carriers in a communication system using orthogonal frequency division multiplexing.

A basic time-frequency structure of a DL in an OFDM system is depicted in FIG. 2, which shows a plurality of OFDM sub-carriers that are contiguous in the frequency direction. The radio resource devoted to a particular user may be called a "chunk", which is a particular number of particular sub-carriers used for a particular period of time. Different groups of sub-carriers are used at different times for different users, and FIG. 2 illustrates chunks for four users A, B, C, D. In the downlink of the exemplary OFDM system depicted by FIG. 2, a chunk includes 15 sub-carriers (not all of which are shown, for clarity) spaced apart by 13.75 kilohertz (kHz), which together occupy approximately 200 kHz in frequency, and 0.625 millisecond (ms) in time. It will be understood that the arrangement of FIG. 2 is just an example and that other arrangements can be used.

Figure 3:
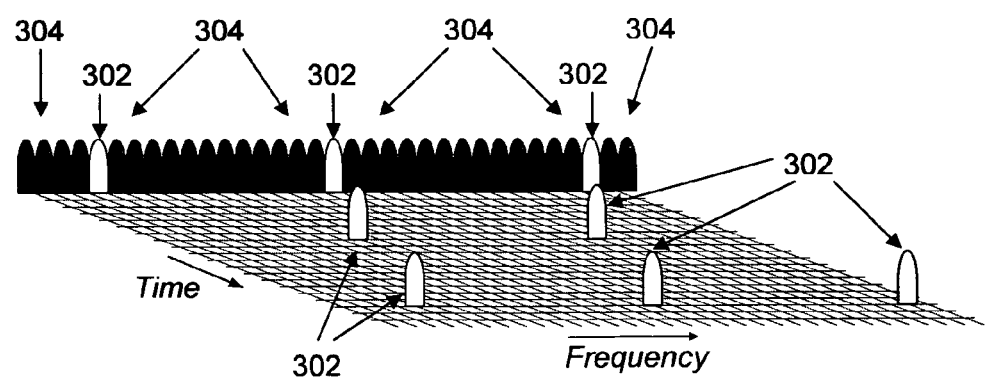
FIG. 3 depicts a time and frequency arrangement of sub-carriers that include pilot signals.

For cell selection purposes, reference signals, so-called pilots, can be transmitted from each base station at known frequency and time instants. An exemplary time-frequency structure with eight such pilots 302 is depicted in FIG. 3, which shows eight sub-carriers having the pilots 302 in the OFDM time-frequency plane. Other OFDM sub-carriers 304 transport data, but for clarity these are indicated in FIG. 3 at only one instant in the time-frequency plane. It will be understood that each chunk typically includes a few pilots on different sub-carriers. It will also be understood that a BS may use multiple transmit antennas to transmit information into a cell/sector/area, and those different transmit antennas may send respective, different pilots.

Figure 1:
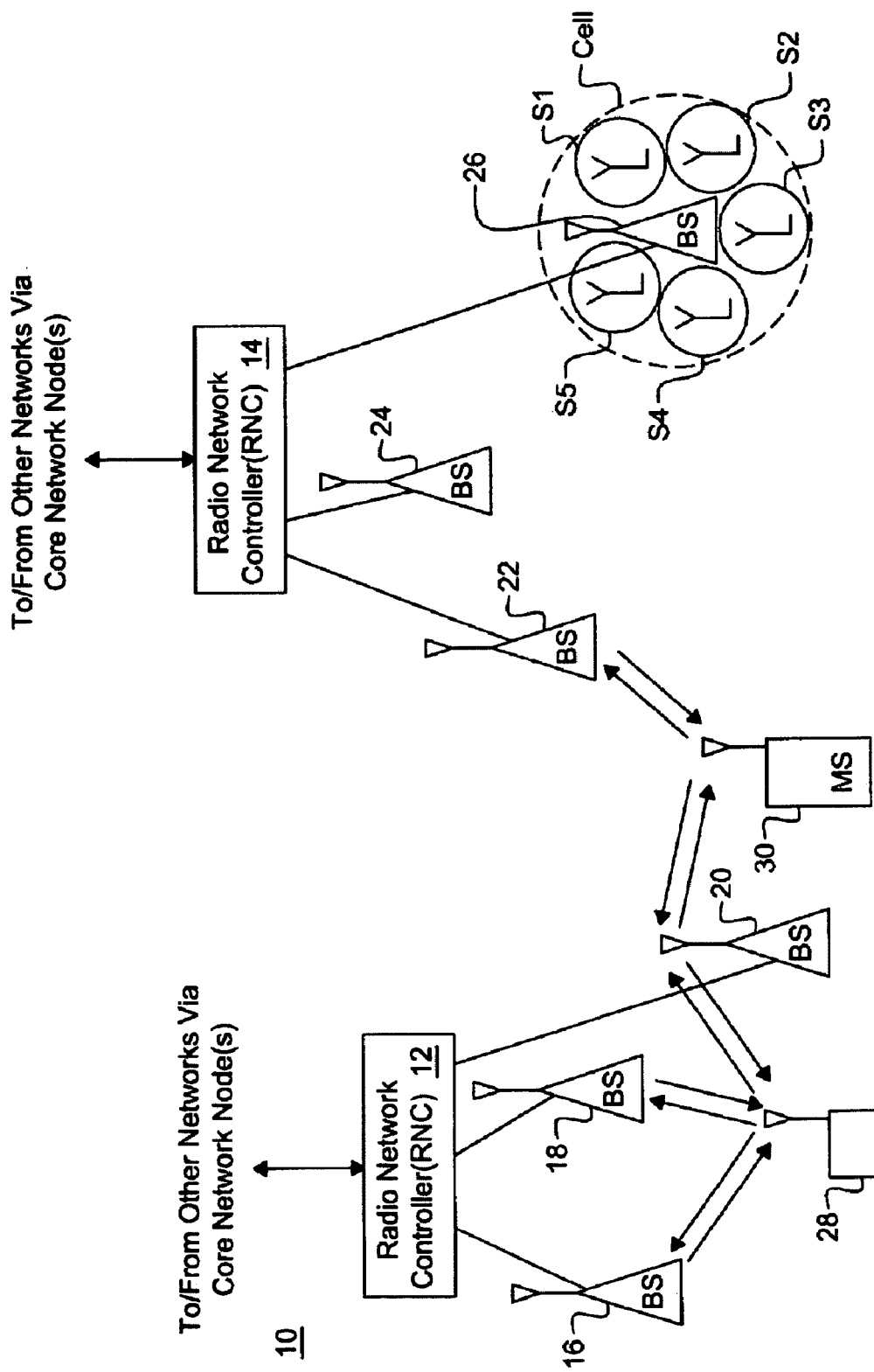
FIG. 1 depicts a cellular radio communication system.

In a communication system such as that depicted in FIGS. 1-3, the problems with cell selection that are described above can be overcome by basing cell selection on at least one of the frequency selectivity, time selectivity, and antenna selectivity of the DL channel. Doing so counters effects of multipath propagation, which results in a pattern of radio waves where minima are encountered when the vector sum of all waves cancel or almost cancel. A receiver moving through such a wave pattern experiences rapid signal variations, or fading, in both the time and frequency domains that present a challenge to upholding and optimizing the transmission and reception of information.

Movement of the receiving antenna through the wave pattern will result in signal variations in time. By reciprocity, the same variations will be observed if the direction of transmission is reversed, i.e., if the moving receiver becomes a moving transmitter and the stationary transmitter becomes a stationary receiver. Furthermore, even if both transmitter and receiver are stationary, movement and changes in the atmosphere and surroundings of the two may result in changes to the wave pattern and hence time variations of the received signal. All types of movement give rise to what is called time-selective multipath fading, or time selectivity, in this application.

The phase of each radio wave depends on the path length, which may be expressed in wavelengths. If the frequency is shifted, the phase of each radio wave may also be shifted, and the wave pattern is changed. Thus, at a given time instant, the received signal will have fading variations over the frequency band, and this is called frequency-selective multipath fading, or frequency selectivity, in this application.

In addition, multiple antennas may be used for transmission and/or reception of the radio waves. Properties of the antenna arrangement, such as relative positions, radiation patterns, mutual coupling, and polarization, result in different weighting and phase shifts of the radio waves at different antennas. Hence, the wave pattern associated with one transmitting antenna may be partially or fully independent of that associated with another transmitting antenna. By reciprocity, the same holds for different receiving antennas. Thus, different signal strengths may be encountered by different antennas, which is called antenna selectivity in this application.

For example, Doppler frequency spread and coherence time of a channel are two measures of time selectivity, the delay spread and coherence bandwidth of the channel are two measures of frequency selectivity, and antenna correlation and mean signal strength per antenna are two measures of antenna selectivity. It will be appreciated that the time, frequency, and antenna selectivities can be measured by other parameters. In particular, it can be advantageous to base an estimate of the delay spread on the coherence bandwidth of a channel rather than on a path delay profile. It is known that the delay spread is inversely proportional to the coherence bandwidth. In some communication systems, such as OFDM systems, the coherence bandwidth is more easily measured than delay spread. For example, in OFDM-based systems, the coherence bandwidth can be easily obtained by correlating sub-carrier signal strengths.

Figure 4A:
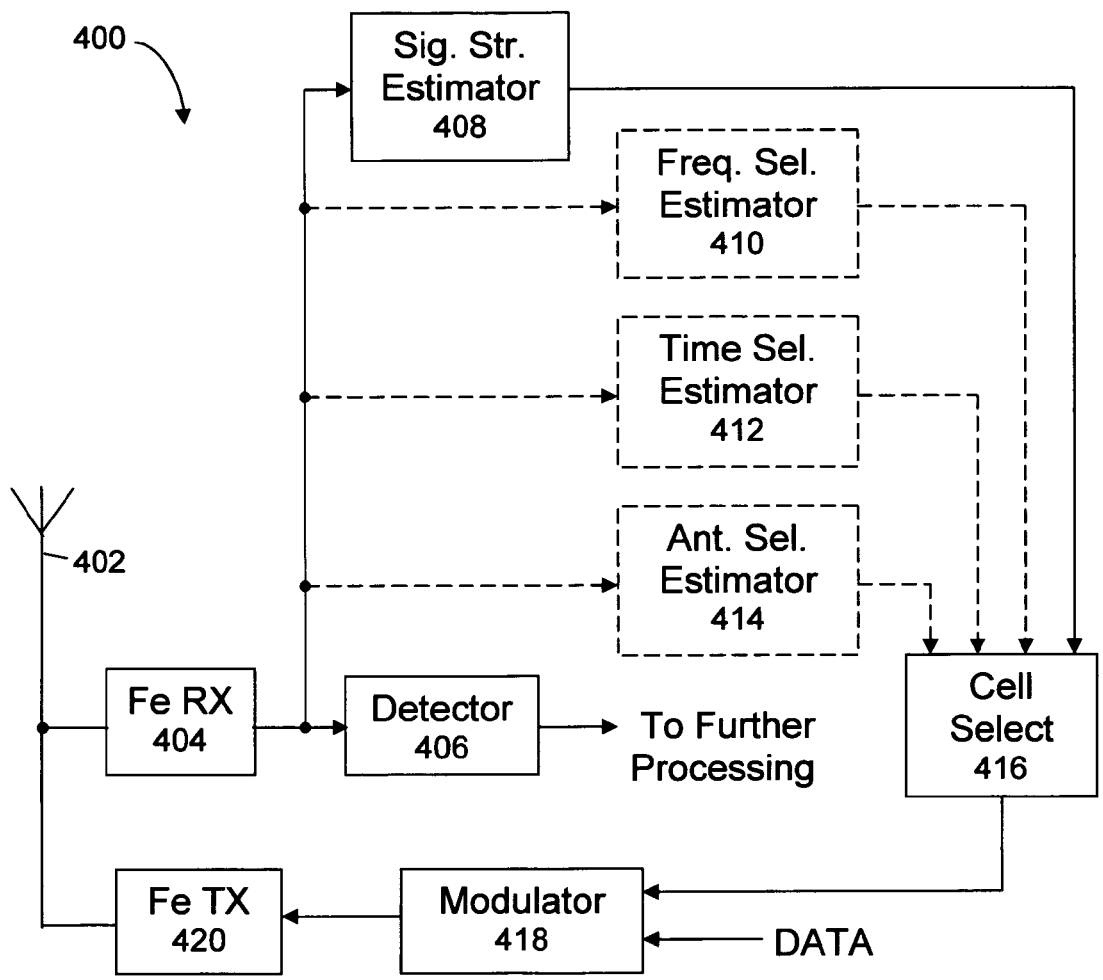
FIG. 4A is a block diagram of a portion of a user equipment for a communication system.

FIG. 4A is a block diagram of a UE, such as a mobile terminal for an OFDM communication system, that includes an apparatus 400 in accordance with this invention. For simplicity, only some parts of the UE are shown in the figure. In particular, signals transmitted by base stations or other entities in the communication system are received by an antenna 402, which may include multiple antenna elements, and are down-converted to base-band signals by a suitable front-end receiver (Fe RX) 404. Signals from the Fe RX 404 are provided to a suitable detector 406 that produces, e.g., by decoding, information carried by the signals that may then be further processed by the UE.

The apparatus 400 includes a signal strength (SS) estimator 408, which generates, based on signals from the Fe RX 404 and on a regular basis for each detected cell i, an estimate of the cell's respective signal strength $S^i$. A suitable SS estimate $S^i$ is the mean signal level of the pilots received from a BS over the whole frequency band. Although one embodiment may use the mean of the signal level over the entire frequency band as a SS measure, other ways of estimating the signal strength are known, and any of these can be used. For example, either the minimum or the maximum pilot signal strength over the band can be used as the SS estimate $S^i$. It will be appreciated, however, that it is not necessary to do any averaging at all, although averaging gives less variability in the signal strength estimate, which of course is desirable. Averaging measurements on even a single sub-carrier can be enough with efficient filtering over fading variations in time. At the other extreme, the signal strength can be estimated by averaging over both time and frequency (and antennas, if there are more than one).

The estimator 408 optionally can filter the signal level measurements with either predetermined filter parameters (e.g., time constant, etc.) or filter parameters that depend on network parameters. For example, the filtering can be a moving average formed with a sliding window of between about 100 ms and a few hundred milliseconds in width. In systems in which fast cell selections are desirable, for example systems providing sector selection, shorter time windows, on the order of milliseconds, could be used. For another example, the filter may be an exponential filter, such that $S^i(t)=aS^i(t-1)+(1-a)P^i(t)$, where $P^i(t)$ is the level of a pilot at time instant t, and a is a network-dependent filter parameter, e.g., 0.5, 0.25, or 0.125. It will be appreciated that the estimator 408 can be implemented by a suitably programmed processor or suitably configured logic circuits.

Because cell selection can be based on one or more of the frequency selectivity, time selectivity, and antenna selectivity of the DL channel, the apparatus 400 may also include an estimator 410 configured to generate estimates of a measure of the frequency selectivity. As described above, one suitable measure is the coherence bandwidth $B_c^i$ of the communication channel between the UE and a respective BS. The device 410 can generate such estimates by determining the correlation in signal strength between pilots at different frequencies but at the same time instant. Also as described above, another suitable measure of the frequency selectivity is the delay spread $T_d^i$ which the estimator 410 can determine from the delay spread's functional relationship to the coherence bandwidth, i.e., $T_d^i=f(B_c^i)$. For example, the functional relationship can be the inverse, where $T_d^i=1/B_c^i$.

The delay spread $T_d$ can also be determined from the path delay profile (PDP). Methods of determining PDPs are well known in the art. For example, the PDP can be estimated by correlating the received signal with a scrambling code for the transmitting cell and a pilot's channelization code for different time lags, where the longest time lag has a length corresponding to a worst-case assumption of the delay spread, e.g., 100 or so chips of the scrambling code. Then, peaks in the PDP can be determined as those peaks in the correlation result that have powers greater than a threshold, e.g., 5% of the highest peak's power. The rest of the correlation result can then be assumed to indicate no signal.

The PDP and the frequency correlation function are a Fourier transform pair, and so the PDP can be simply estimated by, for example, taking an inverse fast Fourier transform (IFFT) of an estimate of the frequency correlation function. The delay spread $T_d$ characterizes the width of the PDP (e.g., the $T_d$ can be the total width or the "standard deviation", depending on the definition of delay spread used), and the coherence bandwidth $B_c$ characterizes the width of the frequency correlation function (and also can depend on the definition used).

As described above, the delay spread $T_d$ and coherence bandwidth $B_c$ have a functional relationship, but the function depends on the shape of the PDP (time-averaged to smooth fast fading) or frequency correlation function. Even so, giving a certain coherence bandwidth imposes a lower bound on the delay spread (and vice versa), according to the following expression:

$$T_d^i \geq C/B_c^i$$

where C is a constant. For some PDPs, such as an exponentially decaying profile, the preceding expression is an equality, but this can not be assumed for most channel realizations that occur in real systems. Thus, it can be better (e.g., more accurate) to estimate the delay spread from the PDP rather than directly from the functional relationship with the coherence bandwidth. Nevertheless, the delay spread and coherence bandwidth are in general two equally good measures of frequency selectivity.

In view of the functional relationship between the coherence bandwidth and the delay spread, it can be understood that cell selection can be based on either the coherence bandwidth $B_c$ or the delay spread $T_d$ as described in more detail below. Of course, the (time-averaged) PDP or the frequency transfer function are more descriptive measures but are more difficult to work with than those two simple numeric measures. Other commonly used measures of multipath fading variations are the magnitude variation (max-min), fading depth, fading width, level crossing rate (LCR), and average duration of fades (ADF). Any of these measures can be applied both to the frequency-selective fading and to the time-selective fading. In any event, it will be appreciated that the frequency sensitivity estimator 410 can be implemented by a suitably programmed processor or suitably configured logic circuits.

The apparatus 400 may also or instead include an estimator 412 configured to generate estimates of a measure of the time selectivity of the DL channel. As described above, one suitable measure is the Doppler frequency shift $F_D{}^i$ of signals from the respective cell i. The Doppler spread reflects the relative speed of a terminal and base station or relay node, and a large Doppler spread generally indicates large channel variations. Another suitable measure is the coherence time, which can be estimated by computing the correlation in signal strength of pilots at different time instants but at the same frequency. The Doppler frequency shift $F_D{}^i$ is just the inverse of the coherence time, and so a way to estimate one is also a way to estimate the other. The Doppler frequency spread and the coherence time have the same type of inequality functional relationship described above with respect to the delay spread and the coherence bandwidth. The space-time correlation function (auto-correlation function) and the Doppler spectrum are measures that are more descriptive of time selectivity than the simpler numeric measures Doppler spread and coherence time, but can be more difficult for a processor to use. It will be appreciated that the estimator 412 can be implemented by a suitably programmed processor or suitably configured logic circuits.

The apparatus 400 may also or instead include an estimator 414 configured to generate estimates of a measure of the antenna selectivity of the DL channel. As described above, one suitable measure is the antenna correlation $C_a{}^i$. Because the UE can identify which received signals come from which of possibly several antennas or antenna lobes at a BS or relay node, such an estimate can be generated by calculating the correlation in signal strength between pilots from different antennas but at the same time instants and the same frequencies. Such an estimate can also be generated by determining the mean signal strengths of the antennas in each cell i, and it will be understood that the mean signal strength per antenna and the antenna correlations are two different measures of the antenna selectivity. The antenna correlation $C_a{}^i$ indicates the amount of antenna diversity, which in turn indicates how much the channel may be expected to vary. A high antenna correlation $C_a{}^i$ indicates little diversity and thus typically large channel variations. It will be appreciated that the estimator 414 can be implemented by a suitably programmed processor or suitably configured logic circuits.

It will be appreciated that the number of antennas itself may be a useful measure of antenna selectivity. It is currently believed that most other measures are usually specific to a particular antenna arrangement, such as a uniform linear array. The combination of mean signal strength per antenna and correlations between all pairs of antennas provides a full description of the antenna selectivity.

Information from the estimator 408 and one or more of the estimators 410, 412, 414 is provided to a cell selector 416, which generates a cell selection signal based on the signal strength and at least one of the frequency, time, and antenna selectivities. The selector 416 may trigger a change of cell either by itself or by reporting its values to the network. A suitable signal indicating a change of cell or a value computed by the selector 416 can be provided to a modulator 418, which also receives other data to be transmitted. For example, in a communication system such as a WCDMA system according to the 3 GPP specification, the UE can trigger an event 1D (change of best cell) by transmitting a Layer-3 radio resource control (RRC) message. The change signal may be transmitted to the base station either on occurrence of the event or on a regular basis. The change signal and data are appropriately transformed into a modulation signal, which is provided to a front-end transmitter (Fe TX) 420 that up-converts or otherwise transforms the modulation signal for transmission to the base station(s) and other entities in the communication system.

In general, the cell selector 416 computes a cell selection function that determines the selected cell, and such a cell selection function f may have the following general form:

$$\text{Cell}=f(S^i,T_d{}^i,F_D{}^i,C_a{}^i)$$

For example, the cell selection function f may be a product, with the signal strength $S^i$ of each cell multiplied by one or more respective weight factors. One weight factor applied to the signal strength $S^i$ can advantageously be an increasing function of the coherence bandwidth $B_c{}^i$. If desired, other weight factors applied to the signal strength can be a decreasing function of the Doppler spread $F_D{}^i$, and/or a decreasing function of the antenna correlation $C_a{}^i$. It may be noted that the signal strength $S^i$ and correlation $C_a{}^i$ are two measures that complement each other, i.e., each does not in itself completely describe the antenna selectivity.

It will be appreciated that other exemplary cell selection functions f and weight-generating functions may be used. For example, the cell selection function f can be a summation over j=1, 2, ..., J utility functions, which is to say that:

$$\text{Cell}=\text{Arg}_i\max\{\Sigma(f_j(v(i,j),j),i\},$$

which selects that cell i having the largest argument.

An example of a suitable utility function u(x) is a piecewise linear ramping function given by:

$$u(x)=0, \text{ for } x<0$$

$$u(x)=x, \text{ for } 0 \leq x \leq 1, \text{ and}$$

$$u(x)=1, \text{ for } x>1.$$

It will be noted that other utility functions, including linear, sigmoid/step, and non-linear functions, may be used.

With such a utility function u, a cell quality metric $Q^i$ can be computed for each cell i according to:

$$Q^i=SS^i+K_{Td}\cdot u(T_d{}^i/T_{dref})+K_{Tc}\cdot u(1-T_c{}^i/T_{cref})+K_{Ca}\cdot u(C_a{}^i/C_{aref})$$

where $SS^i$ is the mean signal strength, $T_d{}^i$ is the delay spread, $T_{dref}$ is a reference time dispersion, $K_{Td}$ is a (typically negative) weight factor, e.g., a constant, that reflects how much the time dispersion affects the cell quality metric, $T_c{}^i$ is the coherence time, $T_{cref}$ is a reference coherence time, $K_{Tc}$ is a (typically negative) weight factor, e.g., a constant, that reflects how much the coherence time affects the cell quality metric, $C_a{}^i$ is the antenna correlation, $C_{aref}$ is a reference antenna correlation (e.g., unity), and $K_{Ca}$ is a (typically negative) weight factor, e.g., a constant, that reflects how much the antenna correlation affects the cell quality metric.

It is currently believed that these functions and weights should be chosen such that the $SS^i$ has the largest impact on $Q^i$, and $T_d{}^i$, $T_c{}^i$, and $C_a{}^i$ should bias this value to enable refined selection between cells having similar $SS^i$. It can be seen that a time dispersion of $T_{dref}$ yields a bias of $K_{Td}$, and a time dispersion of zero yields no bias. A coherence time of $T_{cref}$ yields a zero bias, and a coherence time of zero yields a bias of $K_{Tc}$. A correlation of zero yields no bias, and a correlation of $C_{aref}$ yields a bias of $K_{Ca}$.

The cell quality metric Q can be expressed by the following more general relation:

$$Q^i=g(S^i,T_d{}^i,F_d{}^i,C_a{}^i)$$

for each cell i, and then the cell selection function f is just:

$$\text{Cell}=\text{Arg max}\{Q^i\}.$$

which is described above and which selects that cell having the largest value of the metric Q. The selector 416 can determine the largest value Q with, for example, a comparator, and according to the largest value, the selector 416 may trigger a change of cell either by itself or by reporting its values to another device in the network. It will be understood that a cell can be selected in many alternative but still mathematically equivalent ways to the cell selection functions f described above.

Rather than SS measurements, it should be understood that SIR measurements can be used for cell selection. In such an apparatus 400, the SS estimator 408 estimates a $SIR^i$ for each cell, and $SIR^i$ instead of $S^i$ are used by the selector 416 in carrying out the cell selection procedure. In general, the signal part $S^i$ (the numerator) of the $SIR^i$ can be estimated as described above, and the interference part $I^i$ (the denominator), which may reflect either or both of intra-cell and inter-cell interference, can be estimated using well known Interference estimation techniques. For example, the estimator 408 can model the received signal per pilot $Y^i$ with the following equation:

$$Y^i = h^i \cdot p^i + e^i$$

where $h^i$ is the impulse response of the channel in cell i, $p^i$ is the pilot symbol, and $e^i$ represents noise. An estimate $\hat{h}_i$ of the channel impulse response $h^i$ can be computed in any of many well known ways, for example as described in U.S. Patent Application Publication No. 2005/0105647 by Wilhelmsson et al. for "Channel Estimation by Adaptive Interpolation". The residual error $\hat{e}_i$ can then be estimated according to the following expression:

$$\hat{e}^i = Y^i - \hat{h}^i \cdot p^i$$

and an estimate of the interference $I^i$ can be determined by finding the mean over a number of samples $|\hat{e}^i|^2$.

The estimates of the signal strength $S^i$ or signal-to-interference ratio $SIR^i$, coherence bandwidth $B_c^i$, delay spread $T_d^i$, Doppler spread $F_D^i$, antenna correlation $C_a^i$, etc. can be generated in an apparatus 400 that is included in a UE as depicted in FIG. 4A, but this is not necessary. Rather than have the UE generate a cell selection as shown in FIG. 4A, the UE can send information to a BS via one or more suitably formatted report messages, and the BS or other suitable network entity can use the reported information to generate a cell selection as described above. The information that the UE would send to the BS would include at least the signal strength $S^i$ or signal-to-interference ratio $SIR^i$.

For example, the UE can estimate the signal strength $S^i$ and the antenna correlation $C_a^i$ and send both pieces of information on a regular basis to a BS or relay node. The BS or other node would use that information alone or possibly together with its own estimates of one or both of the frequency and time selectivity measures (e.g., coherence bandwidth $B_c^i$, delay spread $T_d^i$, Doppler spread $F_D^i$, etc.) on the UL channel to generate a cell selection. It is currently believed that this should pose little difficulty when the duplex distance, i.e., the frequency difference between the UL and DL, is low.

Figure 4B:
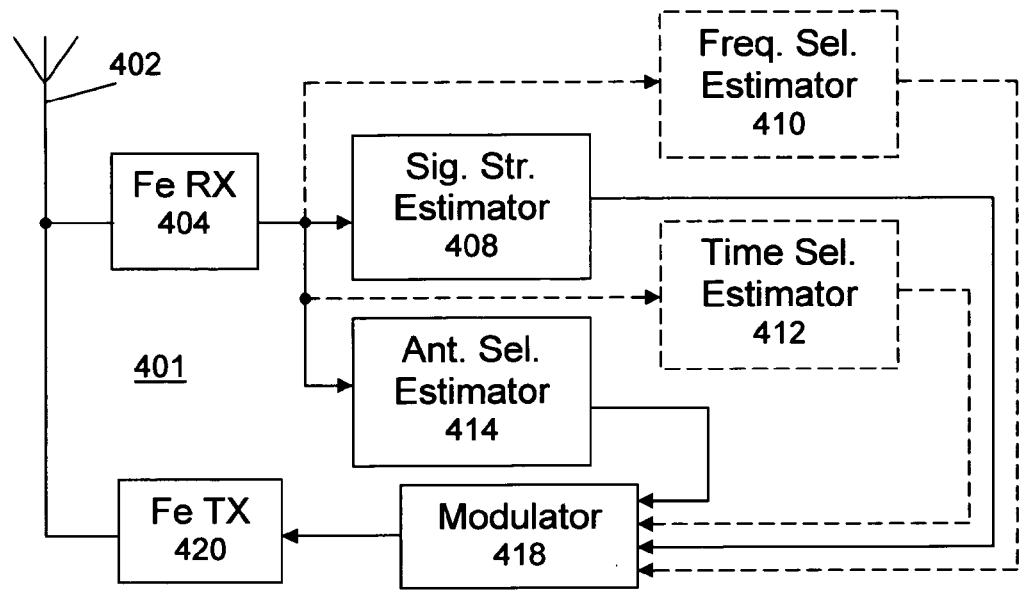
FIG. 4B is a block diagram of a portion of a user equipment and a portion of a communication system.
Figure 4B:
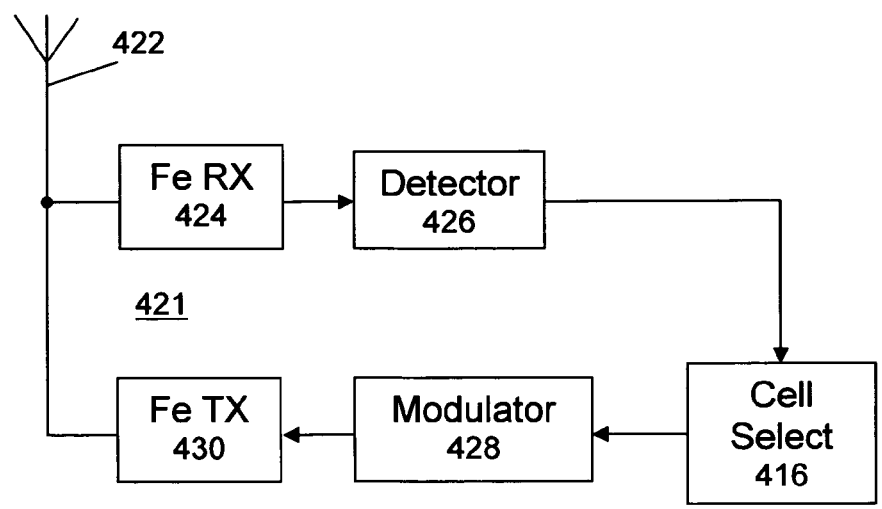

FIG. 4B is a block diagram of such an arrangement, in which the apparatus 400 is distributed between a UE 401 and another entity in the communication system, for example, a base station 421. As in FIG. 4A, only some parts of the UE 401 and base station 421 are shown for simplicity. The apparatus 400 again includes the signal strength estimator 408 and, in this embodiment, the antenna selectivity estimator 414 in the UE 401 and the cell selector 416 in the base station 421. In FIG. 4B, signals transmitted by the base station are received by the UEs antenna 402, are down-converted to base-band signals by a suitable front-end receiver (Fe RX) 404, and are provided to the estimators 408, 414. As described above, the estimator 408 generates on a regular basis for each detected cell i an estimate of at least one of the cells respective signal strength $S^i$ or signal-to-interference ratio $SIR^i$. The estimator 414 is configured to generate estimates of a measure of the antenna selectivity of the DL channel. Both estimates are provided to the UEs modulator 418 and FE TX 420 that up-converts or otherwise transforms the modulation signal for transmission to the base station. The UE's estimates are received by a suitable antenna 422 at the base station 421, down-converted to base-band signals by a suitable Fe RX 424, and recovered by a detector 426. The recovered UE estimates are provided to the cell selector 416, and as described above, the cell selector 416 generates a cell selection signal based on the signal strength or SIR estimate and the antenna selectivity. This cell selection can then be communicated in a suitable form to the UE 401 through a modulator 428 and Fe TX 430 in the base station. It will be understood that other variations are also possible, including for example a UE in which one or both of frequency and time selectivity estimators 410, 412 are provided as described above.

Figure 5:
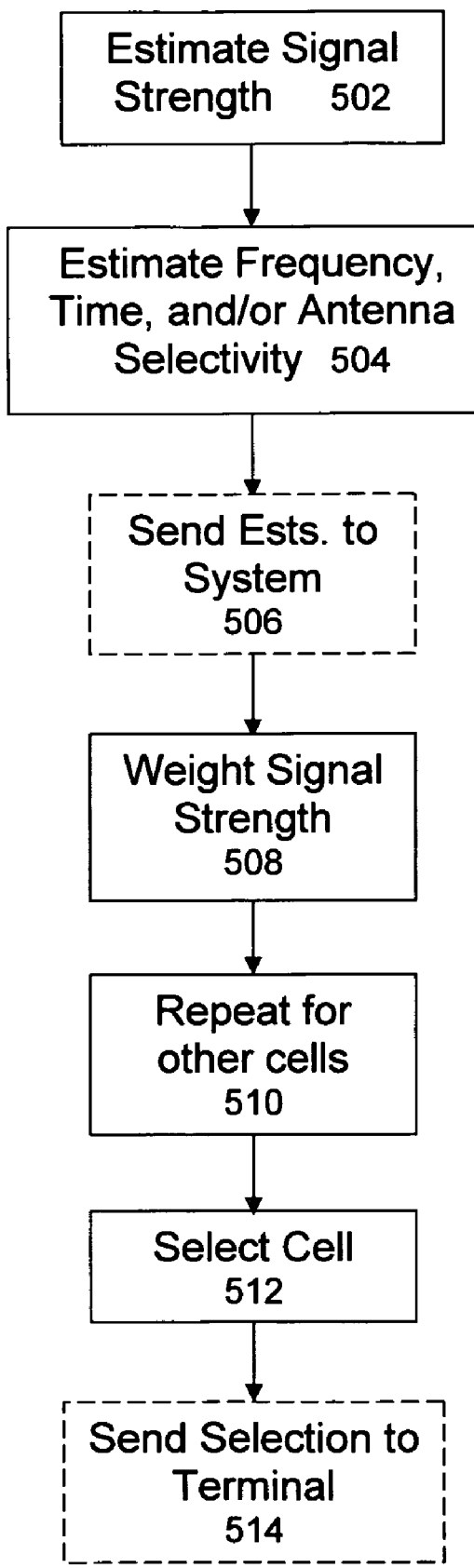
FIG. 5 is a flow chart of a method of cell selection.

Thus, the apparatus 400, which may be disposed in the UE or distributed between the UE and another entity of the communication system, would carry out a method of cell selection such as that illustrated by the flow chart of FIG. 5. A cell's respective signal strength $S^i$ or signal-to-interference ratio $SIR^i$ is estimated (step 502). A measure of at least one of the frequency, time, and antenna selectivities of the DL channel is estimated (step 504). For example, one or more of the coherence bandwidth $B_c^i$, the delay spread $T_d^i$, the Doppler frequency shift $F_D^i$, and the antenna correlation $C_a^i$ is estimated as described above. In a distributed apparatus, these estimates are communicated from a UE to another system entity, such as a base station (step 506), but as described above this is not always necessary as indicated by the dashed lines in FIG. 5. The signal strength is weighted according to the estimate or estimates of selectivity or selectivities (step 508), for example by computing a cell quality metric as described above. These steps are repeated for each cell (step 510), and a cell is selected (step 512) according to a cell selection function, for example by determining the largest weighted signal strength as described above. If needed in a distributed apparatus as indicated by the dashed lines, the cell selection can be communicated to the UE (step 514). It will be understood that the order of these steps and their details can be varied appropriately.

The cell selection methods and apparatus described above provide more efficient and robust cell selection that results in higher QoS, higher capacity, and higher network coverage. To facilitate understanding, many aspects of this invention are described in terms of sequences of actions that can be performed by, for example, elements of a programmable computer system. It will be recognized that various actions could be performed by specialized circuits (e.g., discrete logic gates interconnected to perform a specialized function or application-specific integrated circuits), by program instructions executed by one or more processors, or by a combination of both. Wireless receivers implementing embodiments of this invention can be included in, for example, mobile telephones, pagers, headsets, laptop computers and other mobile terminals, and the like.

Moreover, this invention can additionally be considered to be embodied entirely within any form of computer-readable storage medium having stored therein an appropriate set of instructions for use by or in connection with an instruction-execution system, apparatus, or device, such as a computer-based system, processor-containing system, or other system that can fetch instructions from a medium and execute the instructions. As used here, a "computer-readable medium" can be any means that can contain, store, communicate, propagate, or transport the program for use by or in connection with the instruction-execution system, apparatus, or device. The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium include an electrical connection having one or more wires, a portable computer diskette, a random-access memory (RAM), a read-only memory (ROM), an erasable programmable read-only memory (EPROM or Flash memory), and an optical fiber.

Thus, the invention may be embodied in many different forms, not all of which are described above, and all such forms are contemplated to be within the scope of the invention. For each of the various aspects of the invention, any such form may be referred to as "logic configured to" perform a described action, or alternatively as "logic that" performs a described action.

It is emphasized that the terms "comprises" and "comprising", when used in this application, specify the presence of stated features, integers, steps, or components and do not preclude the presence or addition of one or more other features, integers, steps, components, or groups thereof.

The particular embodiments described above are merely illustrative and should not be considered restrictive in any way. The scope of the invention is determined by the following claims, and all variations and equivalents that fall within the range of the claims are intended to be embraced therein.

What is claimed is:

1. An apparatus in a communication system that includes a plurality of cells, wherein the cells transmit respective signals that include respective pilots through respective channels to a terminal, the apparatus comprising:
  a signal strength estimator configured to generate first estimates of at least one of signal strengths and signal-to-interference ratios of signals received from respective cells;
  an estimator configured to generate second estimates of at least one of a frequency selectivity, a time selectivity, and an antenna selectivity of respective channels between the terminal and respective cells; and
  a cell selector configured to generate a cell selection based on the first estimates and the second estimates;
  wherein the signals are orthogonal frequency division multiplex signals, the second estimates of the frequency selectivity of the channel include estimates of at least one of a coherence bandwidth and a delay spread of the channel, and the estimator is configured to generate the second estimates of the frequency selectivity by calculating a correlation in signal strength between pilots at different frequencies and at a same time instant.

2. The apparatus of claim 1, wherein second estimates of the time selectivity of a channel include estimates of at least one of a Doppler frequency spread and a coherence time of the channel.

3. The apparatus of claim 2, wherein the signals are orthogonal frequency division multiplex signals and the estimator is configured to determine correlations in signal strength between pilots at different time instants and at a same frequency for respective cells.

4. The apparatus of claim 1, wherein second estimates of the antenna selectivity of a channel include estimates of an antenna correlation of the channel.

5. The apparatus of claim 1, wherein the signals are orthogonal frequency division multiplex signals and the estimator is configured to determine correlations in signal strength between pilots from different antennas at a cell and at same time instants and same frequencies.

6. The apparatus of claim 1, wherein the signal strength estimator is configured to generate mean signal levels of pilots received from cells.

7. The apparatus of claim 6, wherein the signal strength estimator is configured to filter the mean signal levels generated.

8. The apparatus of claim 1, wherein the cell selector generates the cell selection based on the first estimates of the signal-to-interference ratio and the second estimates.

9. The apparatus of claim 1, wherein the apparatus is included in the terminal.

10. The apparatus of claim 1, wherein the first and second estimates are generated in the terminal, and the cell selector is included in at least one other entity in the communication system.

11. An apparatus in a communication system that includes a plurality of cells, wherein the cells transmit respective signals that include respective pilots through respective channels to a terminal, the apparatus comprising:
  a signal strength estimator configured to generate first estimates of at least one of signal strengths and signal-to-interference ratios of signals received from respective cells;
  an estimator configured to generate second estimates of at least one of a frequency selectivity, a time selectivity, and an antenna selectivity of respective channels between the terminal and respective cells; and
  a cell selector configured to generate a cell selection based on the first estimates and the second estimates;
  wherein the cell selector generates the cell selection by computing a cell selection function:

$$\text{Cell} = f(S^i, T_d^i, F_D^i, C_a^i)$$

for each cell, in which Cell represents a selected cell, $S^i$ represents a first estimate for a cell i, $T_d^i$ represents a delay spread of the channel between the cell i and the terminal, $F_D^i$ represents a Doppler frequency shift of the channel between the cell i and the terminal, and $C_a^i$ represents an antenna correlation of the channel between the cell i and the terminal.

12. The apparatus of claim 11, wherein the cell selector is configured to determine a quality metric for each cell, and the cell selection function determines the cell i having the largest quality metric.

13. A method of cell selection in a communication system that includes a plurality of cells, wherein the cells transmit respective signals that include respective pilots through respective channels to a receiver, the method comprising:
  generating, within the receiver, first estimates of at least one of signal strengths and signal-to-interference ratios of signals received from respective cells;
  generating, within the system, second estimates of at least one of a frequency selectivity, a time selectivity, and an antenna selectivity of respective channels between the receiver and respective cells; and
  selecting a cell based on the first estimates and the second estimates;
  wherein the signals are orthogonal frequency division multiplex signals, generating second estimates of the frequency selectivity of a channel includes generating estimates of at least one of a coherence bandwidth and a delay spread of the channel, and the second estimates of the frequency selectivity are generated by calculating a correlation in signal strength between pilots at different frequencies and at a same time instant.

14. The method of claim 13, wherein generating second estimates of the time selectivity of a channel includes generating estimates of at least one of a Doppler frequency shift spread and a coherence time of the channel.

15. The method of claim 14, wherein the signals are orthogonal frequency division multiplex signals and the second estimates are generated by determining correlations in signal strength between pilots at different time instants and at a same frequency for respective cells.

16. The method of claim 13, wherein generating second estimates of the antenna selectivity of a channel includes generating estimates of an antenna correlation of the channel.

17. The method of claim 13, wherein the signals are orthogonal frequency division multiplex signals and the second estimates are generated by determining correlations in signal strength between pilots from different antennas at a cell and at same time instants and same frequencies.

18. The method of claim 13, wherein generating first estimates includes generating mean signal levels of pilots received from cells.

19. The method of claim 18, wherein generating first estimates includes filtering the mean signal levels generated.

20. The method of claim 13, wherein selecting the cell includes computing the cell selection based on signal-to-interference ratios and the second estimates.

21. The method of claim 13, wherein the method is carried out in the receiver.

22. The method of claim 13, wherein the steps of generating the first and second estimates are carried out in the receiver; further comprising the step of communicating the first and second estimates to at least one other entity in the communication system; the step of selecting the cell is carried out in the at least one other entity; and further comprising the step of communicating the selected cell to the receiver.

23. A method of cell selection in a communication system that includes a plurality of cells, wherein the cells transmit respective signals that include respective pilots through respective channels to a receiver, the method comprising:
generating, within the receiver, first estimates of at least one of signal strengths and signal-to-interference ratios of signals received from respective cells;
generating, within the system, second estimates of at least one of a frequency selectivity, a time selectivity, and an antenna selectivity of respective channels between the receiver and respective cells; and
selecting a cell based on the first estimates and the second estimates;
wherein selecting the cell includes computing a cell selection function:

Cell=$f(S^i, T_d^i, F_D^i, C_a^i)$ for each cell, in which Cell represents a selected cell, $S^i$ represents a first estimate for a cell i, $T_d^i$ represents a delay spread of the channel between the cell i and the receiver, $F_D^i$ represents a Doppler frequency shift of the channel between the cell i and the receiver, and $C_a^i$ represents an antenna correlation of the channel between the cell i and the receiver.

24. The method of claim 23, wherein selecting the cell includes determining a quality metric for each cell, and the cell selection function determines the cell i having the largest quality metric.

* * * * *